(12) United States Patent
Weaver

(10) Patent No.: US 6,779,469 B1
(45) Date of Patent: Aug. 24, 2004

(54) SEEDING APPARATUS

(75) Inventor: Gregory Dale Weaver, Shelbyville, IN (US)

(73) Assignee: Advanta Technology Inc, Sleaford (GB)

( * ) Notice: Subject to any disclaimer, the term of this patent is extended or adjusted under 35 U.S.C. 154(b) by 0 days.

(21) Appl. No.: 10/633,845

(22) Filed: Aug. 4, 2003

(51) Int. Cl.[7] .............................. A01C 7/00; A01C 9/00
(52) U.S. Cl. ....................... 111/170; 111/200; 111/900
(58) Field of Search ................................ 111/170, 200, 111/900

(56) References Cited

U.S. PATENT DOCUMENTS

| | | |
|---|---|---|
| 5,170,730 A | 12/1992 | Swallow |
| 5,650,609 A | 7/1997 | Mertins et al. |
| 5,847,389 A | 12/1998 | Mertins et al. |
| 5,915,313 A | 6/1999 | Bender et al. |
| 6,193,175 B1 | 2/2001 | Andersson et al. |
| 6,505,124 B2 | 1/2003 | Carr et al. |
| 6,527,205 B2 | 3/2003 | Andersson et al. |

OTHER PUBLICATIONS

Performance Trial Cooperator Agreement executed in spring of 2002 which was used for the 2002 growing season for the trial area plots planted with the Seeding Apparatus between independent contractors and Garst Seed Company.

*Primary Examiner*—Christopher J. Novosad
(74) *Attorney, Agent, or Firm*—Dana S. Rewoldt

(57) ABSTRACT

A seeding apparatus may include a control unit to meter a predetermined amount of seed at desired intervals of time, distance, or the like. For instance, in one embodiment a tractor-towable seeder may include a trailing wheel, a sensor which detects the radial or circumferential travel of the wheel, and a control unit which receives the sensor input and triggers the release of seeds at the desired intervals. The control unit may take a variety of forms, including but not limited to a programmable logic controller or a low-voltage relay and distribution system. Suitable sensors may be selected based on the desired metering apparatus and control device.

16 Claims, 6 Drawing Sheets

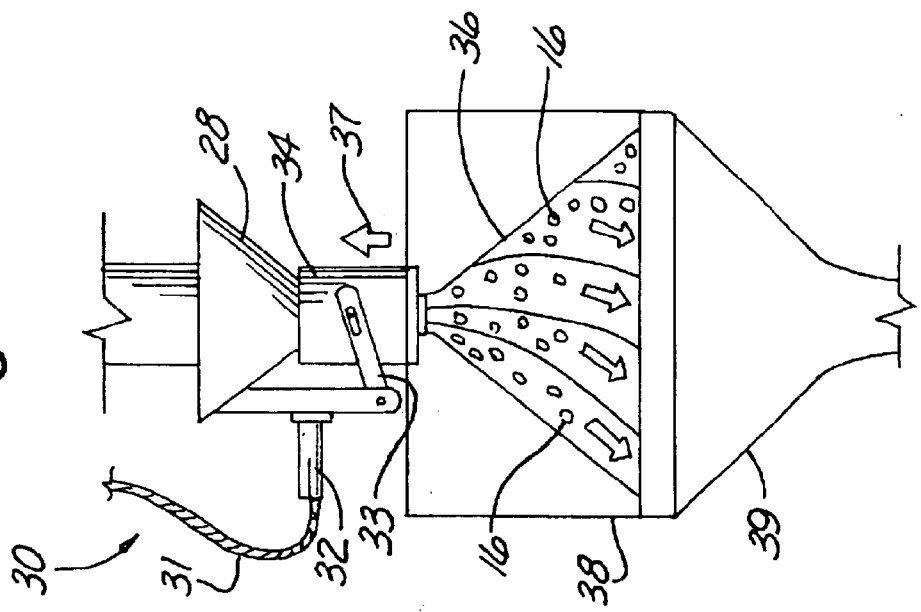
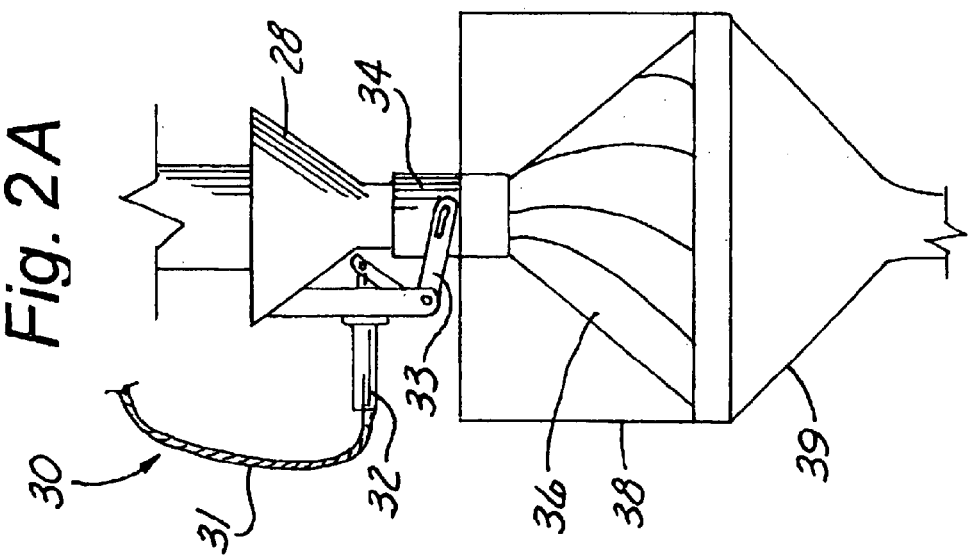

SEEDING APPARATUS

BACKGROUND

Large-scale seed planting typically involves a tractor or other motorized vehicle which pulls a seed planter across a field. During each pass across the field, the seed planter operates to deposit seeds into a trough formed by a cooperating pair of slitters. After seeds are deposited in the trench, a trailing pair of press wheels operate to fill the trough with the soil which was removed by the slitters to form the trough.

Various seeder mechanisms have been developed to dispense seed in cooperation with a slitter assembly. Some mechanisms involve chutes or similar assemblies which deposit seeds onto a cone planter. The cone planter laterally distributes the seeds and feeds them in a controlled manner into an edge-receiving funnel. The seeds are gravity-fed and channeled by the funnel into the troughs formed by the slitter.

In certain environments it may be desired to meter the seeds in a controlled manner such that they are deposited in the soil at relatively fixed concentrations and distances. For instance, it may be desired to deposit seed clusters, each containing a relatively constant number of seeds, at fixed or predetermined distances from one another. Such a protocol is particularly desirable when planting multiple varieties of plants or when conducting controlled agricultural experiments.

A conventional method for accomplishing this objective involves the use of a cable spans the length of a plot to be seeded. The cable is staked into the ground at each end of the field and includes sphere-shaped knobs attached to the cable at a predetermined distance from each other. The seed planter that is pulled behind the tractor has a cable-follower device that contacts the cable and actuates a seed release device each time the cable-follower device moves over a knob on the cable. After each pass across the field, the operator relocates the cable by repositioning the stakes along the next path to be seeded. This conventional practice is time-consuming and is frequently unworkable depending on the dimensions of the field to be planted and the number of workers available to realign the cable for each pass across the field.

SUMMARY

A seeding apparatus may include a control unit to meter a predetermined amount of seed at desired intervals of time, distance, or the like. For instance, in one embodiment a tractor-towable seeder may include a metering wheel, a sensor which detects the radial or circumferential travel of the wheel, and a control unit which receives the sensor input and triggers the release of seeds at the desired intervals. The control unit may include, for instance, a programmable logic controller or a low voltage relay and distribution network. Suitable sensors may be selected based on the desired metering apparatus and control device.

In certain embodiments, the metering wheel may provide improved accuracy in seed deposition at predetermined plot lengths, particularly during long seeding runs. In one preferred embodiment, the metering wheel has a fixed circumference which is an integral of the desired plot length a single trigger disposed on the circumference of the metering wheel such that a seed deposition apparatus is triggered once per rotation of the wheel, thereby optimizing accuracy and precision in measurement of the plot length.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A–B are side views of a release mechanism in accordance with the embodiment of the invention shown in FIG. 1.

Like reference symbols in the various drawings indicate like elements.

DETAILED DESCRIPTION OF ILLUSTRATED EMBODIMENTS

Figure 1:
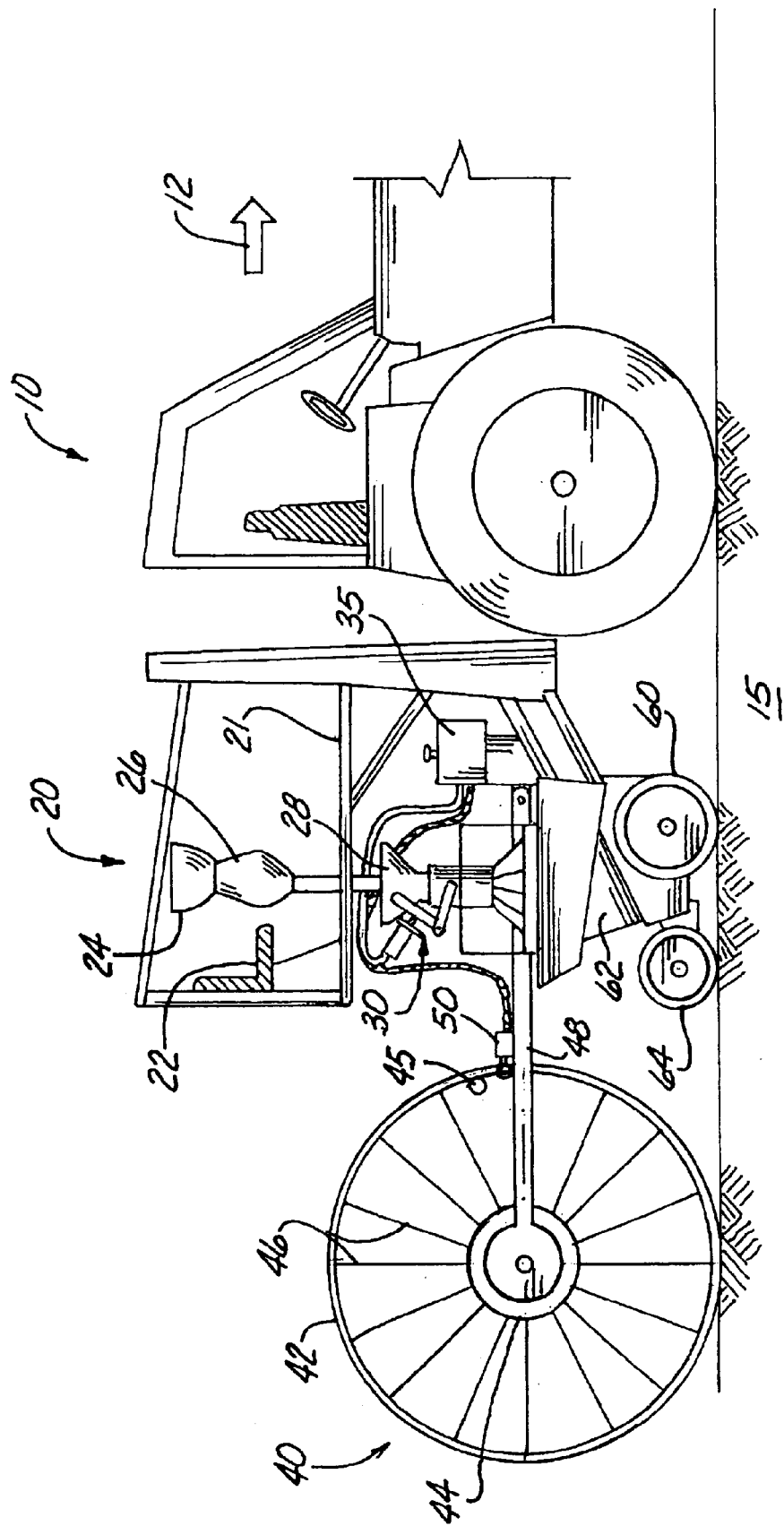
FIG. 1 is a side view of a system for dispensing seeds in accordance with an embodiment of the invention.

Referring to FIG. 1, a tractor 10 or other motorized vehicle is moveable in a forward direction 12 across a ground surface 15, such as a farm field. A seeding apparatus 20 is attached to the tractor 10 such that the apparatus is also moveable along the ground surface 15. In the embodiment shown in FIG. 1, the seeding apparatus 20 is attached to the rear of the tractor 10 and is towed across the ground surface 15. The seeding apparatus 20 may include an operator platform 21 and operator seat 22, which are used by an operator when loading seeds into the seeding apparatus 20. The seeds may be loaded into the apparatus 20 using various known techniques, including the pouring of individual packets of seeds (e.g., a packet of 300 seeds) into an input funnel 24 on the operator platform 21. If multiple rows of seeds are to be planting using a single pass of the seeding apparatus, the seeds may be gravity-fed through a divider device 26 that separates the seeds into two or more funnels 28, with each funnel 28 receiving a similar number of seeds.

The seeding apparatus 20 has at least one release mechanism 30 that is able to stop the flow of seeds through the seeding apparatus 20. The release mechanism 30 may be operated to periodically release seeds for subsequent deposition into the ground. The release mechanism operates in conjunction with an actuation wheel 40 and a sensing device 50, as explained in more detail below. The seeding apparatus 20 may include a control unit 35 that receives signals from the sensing device 50 and activates the release mechanism 30 accordingly.

As shown in FIG. 1, the seeding apparatus 20 also includes a soil-separating device 60 and a soil-closing device 64. The soil-separating device 60 operates to create an opening in the soil for deposition of the seeds into the soil, as explained in more detail below. The seeds are dispensed from the seeding apparatus 20 using a dispensing funnel 62 into the opening created to the soil-separation device 60. After the seeds are deposited in the soil opening, the soil-closing device 64 closes the opening and covers the deposited seeds with soil, as explained in more detail below.

Referring to FIGS. 2A–B, the release mechanism 30 may be activated to dispense seeds 16. In one embodiment, the release mechanism 30 includes a motion actuator 32, a moveable cup 34, and a cone planter 36. The release mechanism 30 dispenses seeds 16 from the funnel 28 to the cone planter 36 using the moveable cup 34 that slides between a closed position (FIG. 2A) and an opened position (FIG. 2B).

Referring to FIG. 2A, the moveable cup 34 is in a closed position such that the cup 34 abuts the surface of the cone planter 36 and restricts the flow of seeds from the funnel 28. The moveable cup 34 may be retained in the closed position by the motion actuator 32, such as an electrically controlled cylinder that is connected to the control unit 35 (FIG. 1) by a cable 31. A circumferential wall 38 may surround the cone planter 36 to prevent spillage of seeds from the release mechanism 30 as the seeds move down the surface of the cone planter 36. The cone planter 36 may include an edge-receiving funnel 39, which eventually leads to the dispensing funnel 62 (FIG. 1).

Referring to FIG. 2B, the release mechanism 30 is activated to dispense seeds 16 down the surface of the cone planter 36. The cup 34 moves from the closed position to the opened position when the motion actuator 32 adjusts the linkage 33 that moves the cup 34 in an upward direction 37. The motion actuator 32 may receive an activation signal from the control unit 35 (FIG. 1), which causes the motion actuator 32 to adjust the linkage 33 and lift the moveable cup 34. In this embodiment, the control unit 35 cause the motion actuator 32 to lift the moveable cup 34 for a predetermined period of time before the cup 34 returns the closed position (FIG. 2A).

Figure 3:
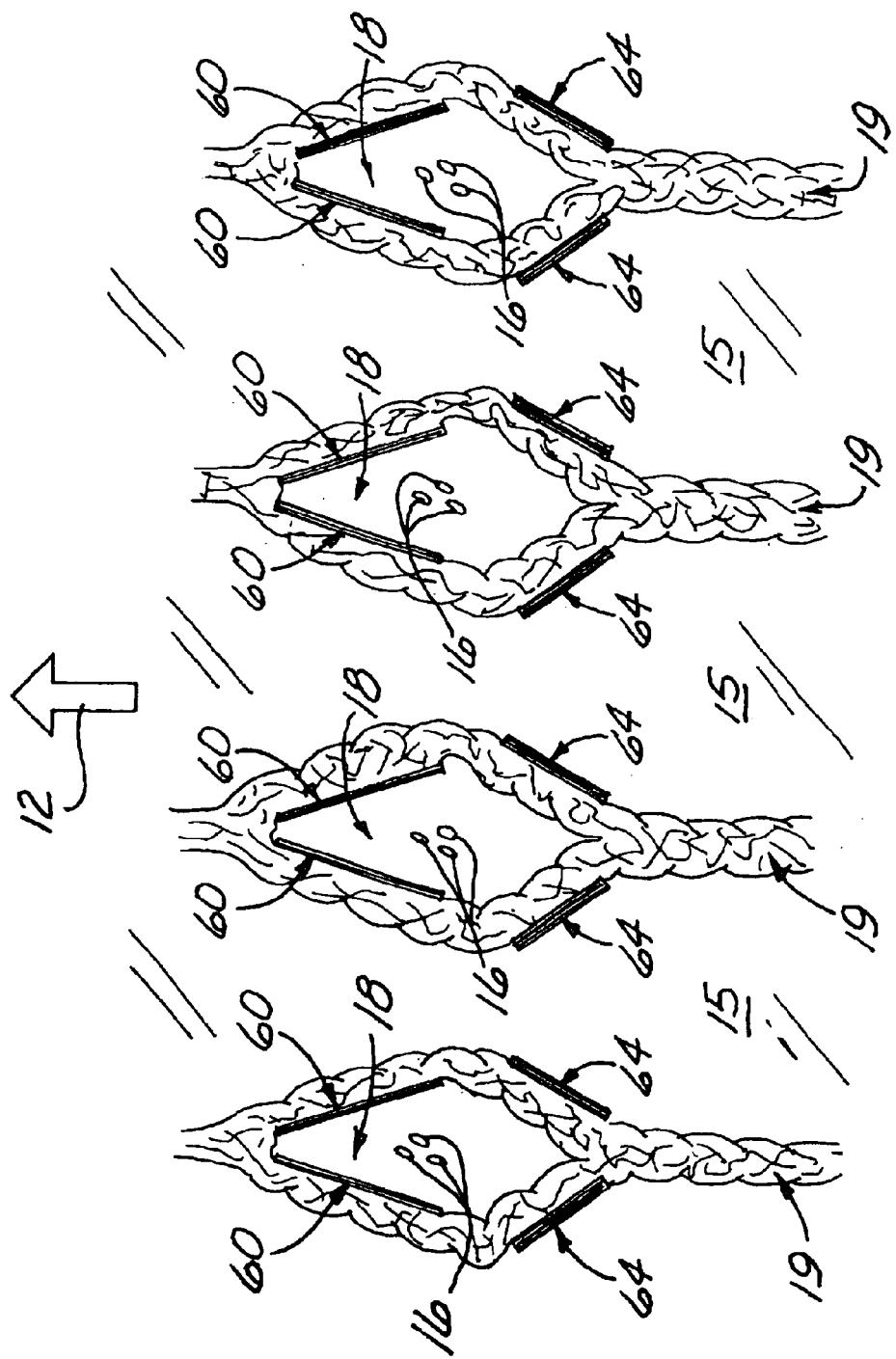
FIG. 3 is a top view of seeds deposited to a ground surface in accordance with an embodiment of the invention.

Referring to FIG. 3, the seeding apparatus 20 may be equipped with four release mechanisms 30 and four corresponding dispensing funnels 62 such that the seeding apparatus 20 deposits four rows 19 of seeds 16 for each pass across the ground surface 15. FIG. 3 shows an above view of the separated soil where the seeds 16 are deposited into the ground surface 15 as the tractor 10 (FIG. 1) and seeding apparatus 20 move in the forward direction 12. As the seeding apparatus 20 moves in the forward direction 12, soil-separating devices 60, such as rigid discs, contact the soil and act as wedges to separate the surface soil. The soil-separating devices 60 create an opening 18, into which the seeding apparatus 20 (FIG. 1) deposits seeds 16. As shown in FIG. 3, the soil-closing devices 64 have a different orientation than the soil-separating devices 60. The soil-closing devices 64 operate to funnel a portion of the surface soil to cover the seeds 16 as the seeding apparatus 20 moves in the forward direction 12. Although FIG. 3 illustrates an embodiment that deposits four rows 19 of seeds while the seeding apparatus 20 moves in the forward direction 12, any number of rows 19 is within the scope of the invention.

Figure 4:
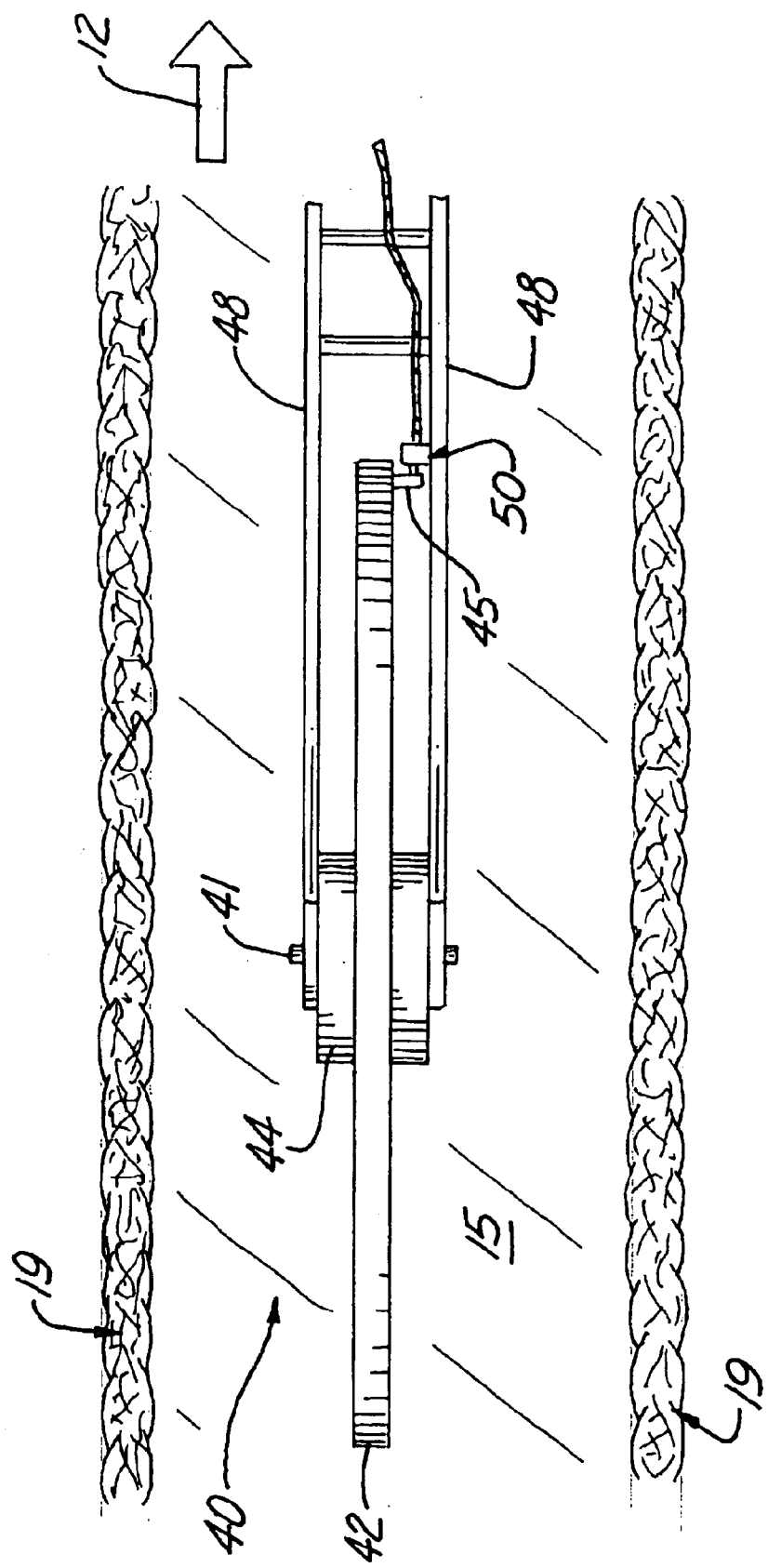
FIG. 4 is a top view of an actuation wheel of the system of FIG. 1.

Referring to FIG. 4, the actuation wheel 40 moves along the ground surface 15 in the forward direction 12 and, preferably, moves between rows 19 of seeds deposited into the ground surface 15. The actuation wheel 40 includes an axle 41 and outer rim 42 connected to a hub 44. In certain embodiments, the rim 42 may be connected to the hub using spokes 46 (FIGS. 1 and 5) and may have treads 43 to engage the ground surface 15. 30 A carrier 48 is attached to the actuation wheel 40 so as to connect the wheel 40 to the seeding apparatus 20 (FIG. 1). A trigger device 45 is attached to the actuation wheel 40 so as to interact with a sensing device 50 that is position proximal to the actuation wheel 40. In the embodiment shown if FIG. 4, the trigger device 45 is a small rod attached to the outer rim 42 that actuates the sensing device 50, which is attached to the carrier 48.

Figure 5:
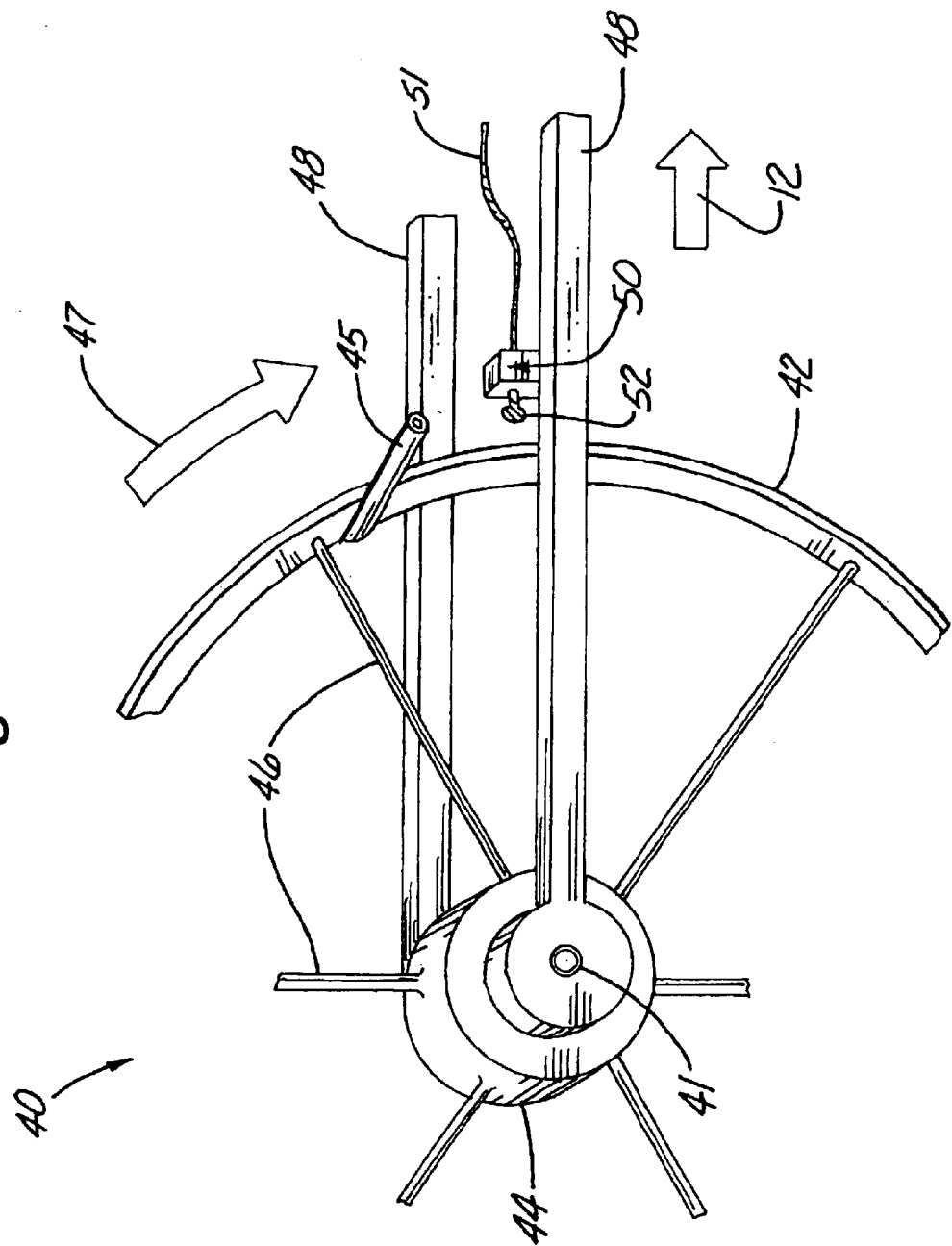
FIG. 5 is a perspective view of a portion of the actuation wheel of FIG. 4.

FIG. 5 shows a portion of the actuation wheel 40 and illustrates an embodiment of the interaction of the trigger device 45 and the sensing device 50. In this embodiment, the sensing device is attached to the carrier 48 and has a switch 52 extending in the direction toward the outer rim 42. As the wheel 40 travels along the ground surface 15, the outer rim 42 and the trigger device 45 move in a circumferential direction 47. When the trigger device 45 passes the sensing device 50, the trigger device 45 actuates the switch 52, which causes a signal to be sent to the control unit 35 via the sensing device cable 51. In this embodiment, only one trigger device 45 is attached to the actuation wheel 40, and thus, the sensing device 50 is actuated once per rotation of the wheel 40.

In one embodiment, the seeding apparatus 20 has four release mechanisms 30 that dispense seeds when a single wheel 40 actuates the sensing device 50. The actuation wheel 40 may be constructed with a predetermined circumference as measured along the outer rim 42. As such, the trigger device 45 actuates the sensing device 50 after the seeding apparatus 20 has traveled the predetermined distance, which causes the release mechanisms 30 to dispense seeds at such an interval. Moveable cups 34 and cone planters 36 that are suitable for operation in the release mechanism 30 may be supplied by Almaco of Nevada, Iowa. The divider devices 26, which separate the seeds into different release mechanisms 30, may be provided by Seedboro Equipment Co. of Chicago, Ill.

Figure 6:
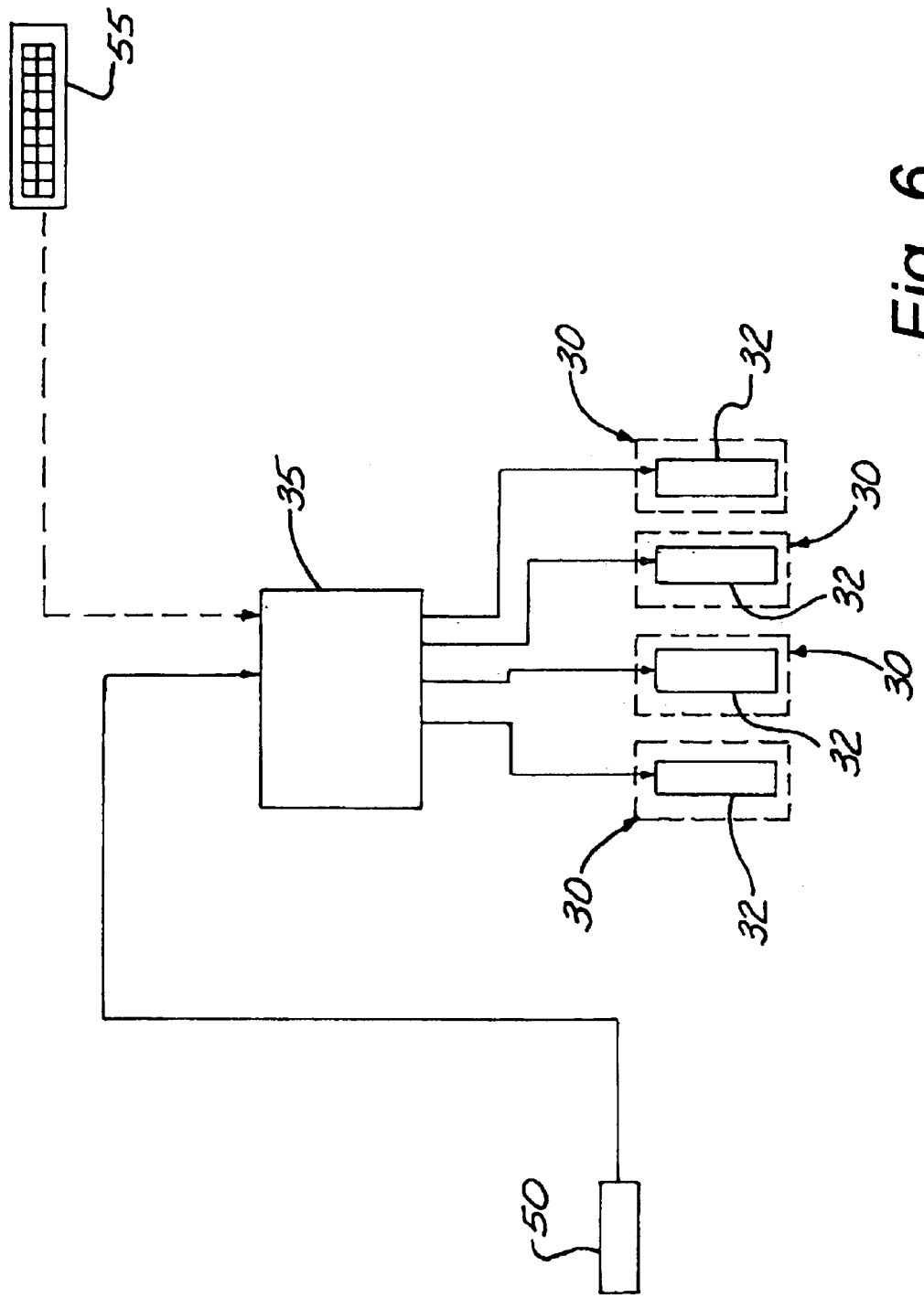
FIG. 6 is a schematic drawing of the control device in accordance with certain embodiments of the invention.

Referring to FIG. 6, certain embodiments of the seeding apparatus 20 include a control unit 35 to operate the motion actuators 32 of the release mechanisms 30. Upon actuation of the sensing device 50, the sensing device 50 sends an output pulse to the control unit 35. In one embodiment, the sensing device 50 is an Omron AP-Z electro-mechanical switch sensor provided by Ornron Corp. of Kyoto, Japan. Upon receiving the pulse, the control unit 35 transmits a signal to the corresponding motion actuators 32. The control unit 35 may contain a control unit comprising a two-stage relay system in which the input from the sensing device 50 is connected to a low-voltage relay switch which is coupled to, and triggers, higher voltage relays which are in turn coupled to the motion actuators 32. As described in more detail below, control units having various other architectures may be employed. Suitable motion actuators 32 are electronic solenoids provided by Syncro-Start Products Inc. of Niles, Ill. (Model No. M-1502). Other suitable motion actuators, such as pneumatic or hydraulic powered actuators, may be used by the release mechanism 30.

Other control units may be selected based on the particular sensing device(s) 50, release mechanisms 30, and user interface (in certain embodiments) incorporated into the seeding apparatus. For example, certain embodiments may require the operator to input the plot length, signal the start or end of each pass across the field, or provide other suitable input. As such, the control unit may include a programmable logic controller (PLC) or other processor-based controller. A suitable PLC is the Allen Bradley PLC-5 controller, which is provided by Rockwell Automation Allen-Bradley of Milwaukee, Wis. In that embodiment, the control unit receives inputs from the sensing device 50 and from the operator (or tractor driver) by way of a user interface 55, such as a keyboard, keypad, touch screen, or switchboard.

As previously described, certain embodiments may include a sensing device 50 that includes an electro-mechanical switch. Alternatively, the sensing device 50 may include a magnetic sensor device. For example, a Hall effect sensor device may use a semiconductor material through which a constant voltage source forces a constant bias current to flow. If the biased Hall sensor is placed in a magnetic field oriented at right angles to the Hall current, the voltage output varies in approximately direct proportion to the strength of the magnetic field. In this embodiment, a Hall effect switch is positioned near the actuation wheel 40 while the trigger device 45 includes a magnetic object or other device that emits a sufficient magnetic field. When the trigger device 45 passes by the Hall effect switch (without necessarily contacting the one another), the hall effect switch senses the "Hall voltage" that is generated by the effect of the external magnetic field. As such, the Hall effect sensor device transmit an appropriate signal to the control unit 35.

An operator may be positioned on the seeding apparatus platform 21 (or sitting in the seat 22) while a tractor driver operates the tractor 10. The operator may periodically unload packets of seeds to the input funnel 22 (FIG. 1), or in some embodiments, to a plurality of input funnels 22. The seeds are passed through the divider devices 26, which preferably divide the number of seeds from each packet in approximate half and send the seeds to different release mechanisms 30 (FIG. 2A). The moveable cup 34 restricts the seeds from flowing downward until the trigger device 45 on the actuation wheel 40 actuates the sensing device 50 (FIG. 5). Upon actuation, the sensing device 50 signals the control unit 35 to activate the release mechanisms 30. When activated, the motion actuators 32 of the release mechanisms 30 lift the cups 34 from the cone planters 36 (FIG. 2B) and the seeds are dispensed into the cone planters 36 and into an opening 18 (FIG. 3) in the ground surface 15.

In one method of operation, the seeding apparatus has two input funnels 24 so that the operator unloads individual packets of seeds into each input funnel 24. A divider device 26 is connected to each input funnel, and each divider device 26 separates the seeds into two different release mechanisms (thus, totaling four release mechanisms). As such, the packet of seeds is divided approximately evenly into two release mechanisms 30. When the trigger device 45 of the wheel 40 actuates the sensing device 50, the release mechanisms 30 dispense the seeds into the cone planter 36 and into openings 18 in the ground surface 15. As the seeding apparatus 20 is moved in the forward direction 12, the soil-closing devices 64 cover the dispensed seeds with soil, thus creating four rows 19 of planted seeds for each pass of the seeding apparatus 20.

In embodiments involving sensors which measure or detect wheel rotation, the metering wheel need not be a separate wheel 40 attached to the rear of the seeding apparatus 20. The sensors may instead measure the rotation of another wheel of the tractor 10 or seeding apparatus 20, which may optionally have a cooperating trigger device (depending on the sensor).

Additionally, the sensing switch 50 may control the activation of the release mechanism directly, without the use of an intervening control unit. For instance, in the electro-mechanical switch embodiment described above, the switch may be coupled directly to the motion actuators so long as the sensor is adapted to output a signal of the appropriate amperage, voltage, and duration.

The metering wheel 40 may include any desired number of trigger devices and may have any predetermined desired circumference. For instance, a wheel having a circumference twice the desired plot length will preferably include two triggers spaced evenly around the circumference of the wheel. Alternately, a wheel having a circumference half the desired plot length may have a single trigger device and an associated control unit which transmits a single trigger pulse to the release mechanism after two trigger devices pass a sensor.

The seeds may be loaded to the funnel 24 using means other than individual seeds packets, such as a continuous feeding apparatus that provides a substantially uninterrupted flow of seed material. In addition, the seeding apparatus 20 may be operated without a divider device 26 if the seeding apparatus 20 uses a single release mechanism 30 to create a single row 19 of planted seeds. Furthermore, the release mechanism 30 may comprise any device that restricts the flow seeds until the release mechanism is activated to dispense the seeds to the soil.

A number of embodiments of the invention have been described. Nevertheless, it will be understood that various modifications may be made without departing from the spirit and scope of the invention. Accordingly, other embodiments are within the scope of the following claims.

What is claimed is:

1. A seeding apparatus, comprising:
    a metering wheel having a predetermined circumference which is a function of a predetermined plot length;
    a rotation sensor to measure the rotation of a wheel and generate a signal in response thereto;
    a controller to receive at least one signal from the rotation sensor and in response thereto generate a trigger signal;
    a seed release mechanism to receive the trigger signal and in response thereto dispense seed substantially at said predetermined plot lengths.

2. The apparatus of claim 1, wherein the rotation sensor is an electro-mechanical switch.

3. The apparatus of claim 1, wherein the wheel circumference is an integral multiple of the predetermined plot length.

4. The apparatus of claim 1, wherein the controller includes a programmable logic controller or a plurality of relays.

5. The apparatus of claim 1, wherein the rotation sensor sends an integral number of sensor signals per wheel rotation and the controller sends a trigger signal after receiving a plurality of said sensor signals.

6. The apparatus of claim 1, wherein the controller sends a trigger signal after an integral or fractional number of rotations of the wheel.

7. The apparatus of claim 1, wherein the wheel is positioned behind the seeding apparatus.

8. The apparatus of claim 1, wherein the wheel is on a tractor that is attached to the seeding apparatus.

9. The apparatus of claim 1, further comprising a user interface coupled to the controller to receive a plurality of seeding parameters input by a user.

10. A method of dispensing seed, comprising:
    sensing the rotation of a metering wheel having a predetermined circumference which is a function of a predetermined plot length;
    generating a trigger signal after the wheel has traveled a distance substantially equal to the predetermined plot length;
    releasing seed in response to the trigger signal substantially at said predetermined plot lengths.

11. The method of claim 10, wherein the rotation sensor is an electro-mechanical switch.

12. The method of claim 10, wherein the wheel circumference is an integral multiple of the predetermined plot length.

13. The method of claim 10, wherein the trigger signal is generated by a programmable logic controller or a relay.

14. The method of claim 10, wherein multiple signals are received from said rotation sensors for each trigger signal that is generated.

15. The method of claim 10, wherein said wheel is positioned behind the seeding apparatus.

16. The method of claim 10, further comprising inputting into a user interface coupled to a controller a plurality of seeding parameters.

* * * * *